(12) United States Patent
Noh et al.

(10) Patent No.: US 12,704,857 B2
(45) Date of Patent: Aug. 11, 2026

(54) METHOD AND SYSTEM FOR CONTROLLING ROBOT AND FACILITY

(71) Applicant: NAVER CORPORATION, Seongnam-si (KR)

(72) Inventors: Maria Noh, Seongnam-si (KR); Yesook Im, Seongnam-si (KR); Myeongsoo Shin, Seongnam-si (KR); Seoktae Kim, Seongnam-si (KR)

(73) Assignee: NAVER CORPORATION, Gyeonggi-do (KR)

( * ) Notice: Subject to any disclaimer, the term of this patent is extended or adjusted under 35 U.S.C. 154(b) by 98 days.

(21) Appl. No.: 18/671,505

(22) Filed: May 22, 2024

(65) Prior Publication Data

US 2024/0310858 A1 Sep. 19, 2024

Related U.S. Application Data

(63) Continuation of application No. PCT/KR2022/015815, filed on Oct. 18, 2022.

(30) Foreign Application Priority Data

Nov. 23, 2021 (KR) ........................ 10-2021-0162616

(51) Int. Cl.
*G05D 1/69* (2024.01)
*G05D 105/20* (2024.01)
*G05D 107/60* (2024.01)

(52) U.S. Cl.
CPC ........... *G05D 1/69* (2024.01); *G05D 2105/20* (2024.01); *G05D 2107/60* (2024.01)

(58) Field of Classification Search
CPC .. G05D 1/69; G05D 2105/20; G05D 2107/60; G05D 2105/31; G05D 1/642;
(Continued)

(56) References Cited

U.S. PATENT DOCUMENTS

2007/0118249 A1* 5/2007 Nagamatsu ............ B25J 9/1666 700/248
2012/0165984 A1 6/2012 Kang et al.
2021/0039255 A1 2/2021 Lee

FOREIGN PATENT DOCUMENTS

JP 2003256045 A * 9/2003
JP 2005148960 A * 6/2005
(Continued)

OTHER PUBLICATIONS

JP2005148960A_Description_Translated.pdf (translation of JP-2005148960-A) (Year: 2025).*
(Continued)

*Primary Examiner* — Bao Long T Nguyen
(74) *Attorney, Agent, or Firm* — Harness, Dickey & Pierce, P.L.C.

(57) ABSTRACT

A method for controlling robots and facilities is performed by one or more processors and includes controlling a first robot to move to a waiting area of a target space, acquiring information that the first robot is located in the waiting area of the target space, determining whether there is a robot in the target space, controlling, in response to determining that there is no robot in the target space, a door of the target space to be opened, controlling, in response to determining that the door is open, the first robot to leave the waiting area and enter the target space, and controlling the first robot to provide a serving service in target space.

12 Claims, 11 Drawing Sheets

(58) Field of Classification Search

CPC ........... G05D 2107/63; G05D 2109/10; G05D 1/225; G05D 1/693; G05D 1/6987; G05D 1/43; G05D 1/0214; B25J 5/00; B25J 9/16; B25J 11/00; B25J 9/1682; B25J 11/008; B25J 5/007; B25J 9/1661; B25J 9/1664; B25J 9/0003; B25J 9/1666; B25J 9/1676

See application file for complete search history.

(56) References Cited

FOREIGN PATENT DOCUMENTS

| | | | |
|---|---|---|---|
| JP | 2013-193147 | A | 9/2013 |
| JP | 2017-107270 | A | 6/2017 |
| KR | 10-2012-0071739 | A | 7/2012 |
| KR | 10-2019-0091233 | A | 8/2019 |
| KR | 10-2104364 | B1 | 4/2020 |
| KR | 10-2245824 | B1 | 4/2021 |
| KR | 10-2021-0119888 | A | 10/2021 |
| KR | 10-2315361 | B1 | 10/2021 |
| KR | 10-2315362 | B1 | 10/2021 |

OTHER PUBLICATIONS

JP2003256045A_Description_Translated.pdf (translation of JP-2003256045-A) (Year: 2025).*

Japanese Office Action dated May 7, 2025 issued in Japanese Patent Application No. 2024-531178.

Korean Notice of Allowance dated Oct. 14, 2024 issued in Korean Patent Application No. 10-2021-0162616, with English translation.

International Search Report dated Feb. 24, 2023 issued in PCT Application No. PCT/KR2022/015815.

* cited by examiner 600
612
624
622
614
618
630
616
620
610

METHOD AND SYSTEM FOR CONTROLLING ROBOT AND FACILITY

CROSS-REFERENCE TO RELATED APPLICATION

This application is a continuation of International Patent Application No. PCT/KR2022/015815 filed on Oct. 18, 2022, which is based upon and claims the benefit of priority to Korean Patent Application No. 10-2021-0162616, filed on Nov. 23, 2021. The disclosures of the above-listed applications are hereby incorporated by reference herein in their entirety.

BACKGROUND

Technical Field

The present disclosure relates to methods, systems, and/or buildings for controlling robots and facilities, and specifically, to methods, systems, and/or buildings for efficiently and safely controlling the robots in consideration of the convenience of users of services when a plurality of robots enter an indoor space.

Description of Related Art

In recent years, the movement to commercialize delivery robots is accelerating not only in the domestic market but also in the global market. The related service robots are designed in such a way that hardware for controlling the autonomous driving of the robot is mounted on the robot itself. However, mounting a high-performance processing device inside the robot as described above makes it difficult to reduce the size or weight of the robot.

In addition, considering the cost of a camera or Light Detection and Ranging (LiDAR) sensor mounted on an autonomous robot, it may be practically difficult to commercialize a delivery robot with the related method. Furthermore, when a problem of driving the robot occurs, it is necessary to pick up the robot and analyze the problem, which is cumbersome. This may act as a major barrier to advancing the timing of the popularization of delivery services using robots.

SUMMARY

In order to address one or more problems (e.g., the problems described above and/or other problems not explicitly described herein), the present disclosure provides methods, a non-transitory computer-readable recording mediums storing instructions, apparatuses (systems), and/or buildings for controlling robots and facilities.

A method for controlling robots and facilities may be performed by one or more processors and may include controlling a first robot to move to a waiting area for a target space, acquiring information that the first robot is located in the waiting area for the target space, determining whether a robot is present in the target space, controlling, in response to determining that no robot is present in the target space, a door of the target space to be opened; controlling, in response to determining that the door is open, the first robot to leave the waiting area and enter the target space, and controlling the first robot to provide a serving service in target space.

A computer-readable non-transitory recording medium storing instructions that, when executed by one or more processors, cause a robot control system to perform the aforementioned method for controlling robots and facilities may be provided.

A robot control system may include a memory, and one or more processors connected to the memory and configured to execute one or more computer-readable programs included in the memory to cause the robot control system to control a first robot to move to a waiting area for a target space, acquire information that the first robot is located in the waiting area for the target space, determine whether a robot is present in the target space, control, in response to determining that no robot is present in the target space, a door of the target space to be opened, controlling, in response to determining that the door is open, the first robot to leave the waiting area and enter the target space, and control the first robot to provide a serving service in the target space.

A building may include a plurality of robots configured to drive in the building and provide serving services, wherein the plurality of robots may include a first robot and a second robot, the plurality of robots may be configured to be controlled by a robot control system, and the robot control system may include a memory, and one or more processors connected to the memory and configured to execute one or more computer-readable programs included in the memory to cause the robot control system to control a first robot to move to a waiting area for a target space, acquire information that the first robot is located in the waiting area for the target space, determine whether a robot is present in the target space, control, in response to determining that no robot is present in the target space, a door of the target space to be opened, control, in response to determining that the door is open, the first robot to leave the waiting area and enter the target space, and control the first robot to provide a serving service in the target space.

According to some aspects of the present disclosure, it is possible to efficiently control the driving of the robot using a cloud-based robot control system.

According to some aspects of the present disclosure, the robot can be controlled to avoid obstacles without a high-performance sensor.

According to some aspects of the present disclosure, if there is a request for a serving service exceeding the number of items that can be loaded in one robot, the serving service can be efficiently provided using a plurality of robots.

According to some aspects of the present disclosure, it is possible to control the robot's path efficiently and also improve the convenience of a user receiving the service.

BRIEF DESCRIPTION OF THE DRAWINGS

The above and other objects, features and advantages of the present disclosure will become more apparent to those of ordinary skill in the art by describing in detail some example embodiments thereof with reference to the accompanying drawings, in which.

DETAILED DESCRIPTION

Figure 1:
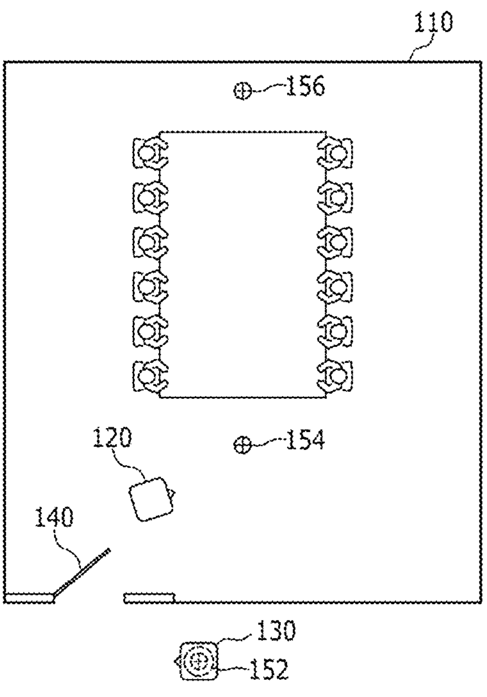
FIG. 1 illustrates an example in which a plurality of serving robots enter a target space.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended to mean that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

The singular forms "a," "an," and "the" as used herein are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles (e.g., functions). However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but is not limited thereto. For example, the system may include one or more server devices. In another example, the system may include one or more cloud devices. In still another example, the system may include both the server device and the cloud device operated in conjunction with each other.

FIG. 1 illustrates an example in which a plurality of serving robots 120 and 130 enter a target space 110. The serving robots 120 and 130 may load items to be served and travel to the target space 110 to provide a serving service. The serving robots 120 and 130 may refer to any device that controls the driving state by itself based on a signal (or data) received from an external device (or an external system). In addition, the target space 110 may refer to a destination where the serving service by the serving robot will be provided in the building.

The plurality of serving robots 120 and 130 may move to the target space 110. In general, the number, weight, or size of the items loadable to one serving robot may be limited. For example, a maximum of six cups of coffee may be loaded on each of the plurality of serving robots 120 and 130. Accordingly, if the items to be served include 12 cups of coffee, the two serving robots 120 and 130 may each load 6 cups of coffee and move to the target space 110 to provide the corresponding serving service.

The first serving robot 120 of the plurality of serving robots 120 and 130 may first enter the target space 110, provide the serving service and exit, and the second serving robot 130 may enter the target space 110 and provide the serving service. For example, first, the first serving robot 120 of the plurality of serving robots 120 and 130 may arrive in a waiting area 152, enter the target space 110, provide the serving service at a first point 154, and exit. The second serving robot 130 may secondly arrive in the waiting area 152, enter the target space 110, provide the serving service at the first point 154, and exit. As another example, while the first serving robot 120 of the plurality of serving robots 120 and 130 arrived in the waiting area 152 of the target space 110 is entering the target space 110 and providing the serving service at the first point 154, the second serving robot 130 may secondly arrive in the waiting area 152 and wait. The second serving robot 130 may enter the target space 110 and provide the serving service at the first point 154 upon exit of the first serving robot 120. In this case, the plurality of serving robots 120 and 130 may all provide the serving service at the first point 154 of the target space 110.

According to another aspect, the second serving robot 130 of the plurality of serving robots 120 and 130 may enter the target space 110 and provide the serving service before the first serving robot 120 that first entered the target space 110 exits. For example, while the first serving robot 120 first arrived in the waiting area 152 is entering the target space 110, the second serving robot 130 may secondly arrive in the waiting area 152. In this case, after the first serving robot 120 arrives at the first point 154 (or while it is moving to the first point 154), the second serving robot 130 may enter the target space 110 and provide the serving service. As another example, while the first serving robot 120 first arrived in the waiting area 152 is providing the serving service at the first point 154, the second serving robot 130 that has secondly arrived may arrive in the waiting area 152. Even in this case, the second serving robot 130 may enter the target space 110 and provide the serving service while the first serving robot 120 is providing the serving service. In this case, the first serving robot 120 and the second serving robot 130 may provide the serving service at a second point 156 and the first point 154, respectively.

A door 140 of the target space 110 may be opened or may remain in an open state for the entry of the plurality of serving robots 120 and 130. For example, the door 140 may be in the closed state and then opened for entry of the first serving robot 120 of the plurality of serving robots 120 and 130, which is the first serving robot arriving in the waiting area 152. As another example, the door 140 may be in the open state and remain in the open state for entry of the second serving robot 130 of the plurality of serving robots 120 and 130, which is the second serving robot arriving in the waiting area 152. According to another aspect, the door 140 of the target space 110 may be closed upon exit of the plurality of serving robots 120 and 130. For example, the door 140 in the open state may be closed as the last robot (e.g., the second serving robot 130 of the plurality of serving robots 120 and 130) exits. In other words, the closed door 140 may remain closed if there is no third serving robot (not illustrated) to enter the target space 110 after the exit of the second serving robot 130.

Figure 2:
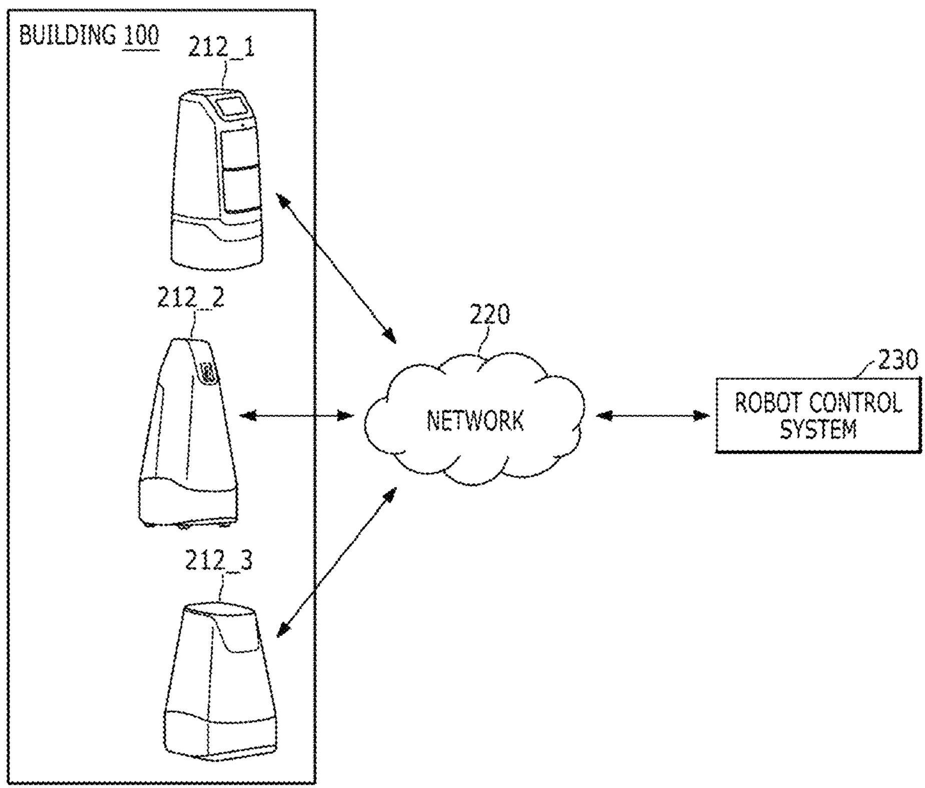
FIG. 2 is a schematic diagram illustrating a configuration in which a robot control system is communicatively connected to a plurality of robots.

FIG. 2 is a schematic diagram illustrating a configuration in which a robot control system 230 is communicatively connected to a plurality of robots 212_1, 212_2, and 212_3. As illustrated, the robot control system 230 may be configured to control the movement and/or operation of the plurality of robots 212_1, 212_2, and 212_3 through a network 220. The robot control system 230 may include one or more server devices and/or databases, or one or more distributed computing devices and/or distributed databases based on a cloud computing service capable of storing, providing, and executing computer-executable programs (e.g., downloadable applications) and data for identifying the location of the plurality of robots 212_1, 212_2, and 212_3, and controlling the movement of the robot 212. The robot control system 230 may be located inside or outside of a building 100 in which the robot 212 is located.

The plurality of robots 212_1, 212_2, and 212_3 may travel inside the building 210 and communicate with the robot control system 230 through the network 220. The network 220 may be configured to enable communication between the plurality of robots 212_1, 212_2, and 212_3 and the robot control system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, etc.) that may be included in the network 220 as well as short-range wireless communication between the robots 212_1, 212_2, and 212_3, but aspects are not limited thereto. For example, the network 220 may include any one or more of networks including a personal area network (PAN), a local area network (LAN), a campus area network (CAN), a metropolitan area network (MAN), a wide area network (WAN), a broadband network (BBN), the Internet, etc. In addition, the network 220 may include any one or more of network topologies including a bus network, a star network, a ring network, a mesh network, a star-bus network, a tree or hierarchical network, etc., but not limited thereto.

FIG. 2 illustrates an item and food delivery robot 212_1, a guide robot 212_2, and a beverage delivery robot 212_3 as examples of the robots, but aspects are not limited thereto, and a plurality of robots 212_1, 212_2, and 212_3 may be any robot capable of wireless communication and autonomous driving. In addition, while FIG. 2 illustrates three robots 212_1, 212_2, and 212_3 in communication with the robot control system 230 through the network 220, aspects are not limited thereto, and accordingly, a different number of the robots 212_1, 212_2, and 212_3 may be configured to be in communication with the robot control system 230 through the network 220.

Figure 3:
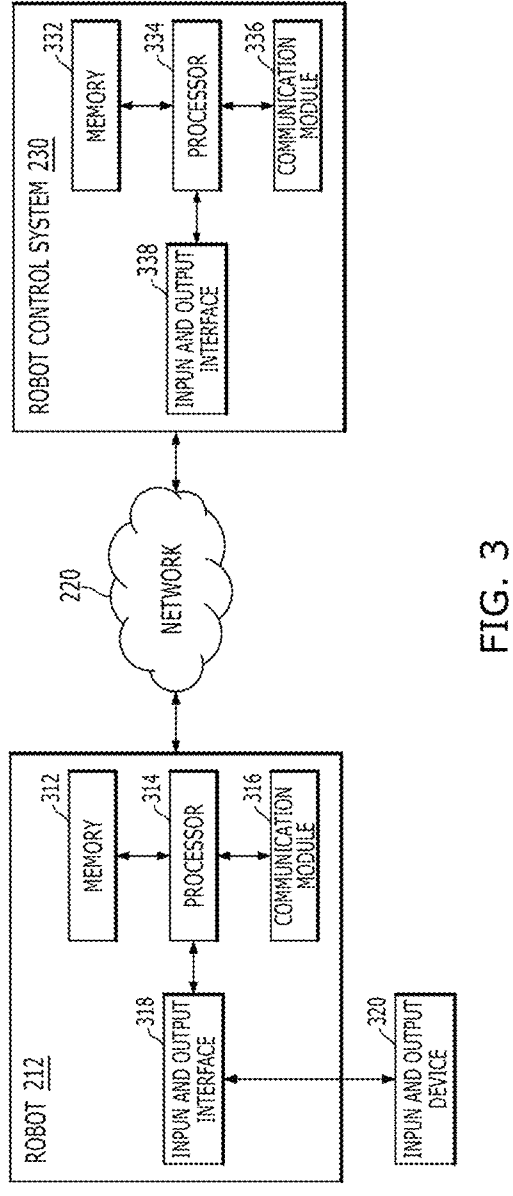
FIG. 3 is a block diagram illustrating an internal configuration of a robot and a robot control system.

FIG. 3 is a block diagram illustrating internal configurations of the robot 212 and the robot control system 230. The robots 212_1, 212_2, and 212_3 may be any computing device capable of wired and/or wireless communication and capable of installing and executing computer programs (e.g., applications, etc.). As illustrated, the robot 212 may include a memory 312, a processor 314, a communication module 316, and an input and output interface 318. Likewise, the robot control system 230 may include a memory 332, a processor 334, a communication module 336, and an input and output interface 338. As illustrated in FIG. 3, the robot 212 and the robot control system 230 may be configured to communicate information, data, etc. through the network 220 using respective communication modules 316 and 336. In addition, an input and output device 320 may be configured to input information and/or data to the robot 212 or to output information and/or data generated from the robot 212 through the input and output interface 318.

The memories 312 and 332 may include any non-transitory computer-readable recording medium. The memories 312 and 332 may include a permanent mass storage device such as random access memory (RAM), read only memory (ROM), disk drive, solid state drive (SSD), flash memory, etc. As another example, a non-destructive mass storage device such as ROM, SSD, flash memory, disk drive, etc. may be included in the robot 212 or the robot control system 230 as a separate permanent storage device that is distinct from the memory. In addition, an operating system and at least one program code (e.g., a code for autonomous driving/service provision/movement/stop, etc. installed and driven in the robot 212) may be stored in the memories 312 and 332.

These software components may be loaded from a computer-readable recording medium separate from the memories 312 and 332. Such a separate computer-readable recording medium may include a recording medium directly connectable to the robot 212 and the robot control system 230, and may include a computer-readable recording medium such as a floppy drive, a disk, a tape, a DVD/CD-ROM drive, a memory card, etc., for example. In another example, the software components may be loaded into the memories 312 and 332 through the communication modules rather than the computer-readable recording medium. For example, at least one program may be loaded into the memories 312 and 332 based on a computer program installed by files provided by developers or a file distribution system that distributes an installation file of an application via the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in a recording device such as the memories 312 and 332.

The communication modules 316 and 336 may provide a configuration or function for the robot 212 and the robot control system 230 to communicate with each other through the network 220, and may provide a configuration or function for the robot 212 and/or the robot control system 230 to communicate with another robot, a user terminal, or another system (e.g., a separate cloud system, etc.). For example, a request or data (e.g., data on position information) generated by the processor 314 of the robot 212 according to a program code stored in a recording device such as the memory 312 may be transmitted to the robot control system 230 through the network 220 under the control of the communication module 316.

Conversely, a control signal or command provided under the control of the processor 334 of the robot control system 230 may be received by the robot 212 through the communication module 316 of the robot 212 through the communication module 336 and the network 220. For example, the robot 212 may receive a latest map, a movement command, a movement destination or a movement path, a stop command, etc. from the robot control system 230.

The input and output interface 318 may be a means for interfacing with the input and output device 320. As an example, the input device may include a device such as a camera including an audio sensor and/or an image sensor, a keyboard, a microphone, a mouse, etc., and the output device may include a device such as a display, a speaker, a haptic feedback device, etc. As another example, the input and output interface 318 may be a means for interfacing with a device such as a touch screen, etc. that integrates a configuration or function for performing inputting and outputting. For example, when the processor 314 of the robot 212 processes the instructions of the computer program loaded into the memory 312, a service screen, etc., which is configured with the information, data, etc. provided by the robot control system 230, etc., may be displayed on the display via the input and output interface 318. While FIG. 3 illustrates that the input and output device 320 is not included in the robot 212, aspects are not limited thereto, and it may be configured as one device with the robot 212. In addition, the input and output interface 338 of the robot control system 230 may be a means for interfacing with a device (not illustrated) for inputting or outputting that may be connected to, or included in the robot control system 230. While FIG. 3 illustrates the input and output interfaces 318 and 338 as the components configured separately from the processors 314 and 334, aspects are not limited thereto, and the input and output interfaces 318 and 338 may be configured to be included in the processors 314 and 334.

The robot 212 and the robot control system 230 may include more components than those illustrated in FIG. 3. Meanwhile, most of the related components may not necessarily require exact illustration. The robot 212 may be implemented to include at least a part of the input and output device 320 described above. In addition, the robot 212 may further include other components such as a transceiver, a Global Positioning System (GPS) module, a camera, various sensors, a database, etc. For example, if the robot 212 is a serving-only robot, the robot 212 may generally include components included in the robot for serving, and for example, may be implemented such that various components such as an acceleration sensor, a gyro sensor, a proximity sensor, a camera module, various physical buttons, buttons using a touch panel, input and output ports, a vibrator for vibration, etc. are further included in the robot 212.

The processor 314 of the robot 212 may be configured to perform autonomous driving under the control of the robot control system 230. In this case, an associated program code may be loaded into the memory 312 of the robot 212. While the robot 212 is driving, the processor 314 of the robot 212 may receive information and/or data provided from the input and output device 320 through the input and output interface 318 or receive information and/or data from the robot control system 230 through the communication module 316, and process the received information and/or data and store the result in the memory 312. In addition, such information and/or data may be provided to the robot control system 230 through the communication module 316.

While the robot is driving, the processor 314 may receive text, image, video, voice, etc. input or selected through the input device such as a camera, a microphone, etc. that includes a touch screen, a keyboard, an audio sensor and/or an image sensor connected to the input and output interface 318, and store the received text, image, video and/or voice, etc. in the memory 312, or provide it to the robot control system 230 through the communication module 316 and the network 220. For example, the processor 314 may receive an image input through a camera including an image sensor and provide the received image to the robot control system 230 through the communication module 316 and the network 220.

The processor 314 of the robot 212 may be configured to manage, process, and/or store information and/or data received from the input and output device 320, another robot, the robot control system 230, and/or a plurality of external systems. The information and/or data processed by the processor 314 may be provided to the robot control system 230 via the communication module 316 and the network 220. The processor 314 of the robot 212 may transmit the information and/or data to the input and output device 320 via the input and output interface 318 and output the data. For example, the processor 314 may display the received information and/or data on the display of the robot 212.

The processor 334 of the robot control system 230 may be configured to manage, process, and/or store information and/or data received from the plurality of robots and/or the plurality of external systems. The information and/or data processed by the processor 334 may be provided to the robot 212 via the communication module 336 and the network 220. For example, the processor 334 may provide information on a destination of movement for each of the plurality of robots and may control each of the plurality of robots to move to such a destination.

FIG. 3 illustrates the robot control system 230 as a single system, but aspects are not limited thereto, and the robot control system 230 may include a plurality of systems and servers.

The processor 334 of the robot control system 230 may be configured to output the processed information and/or data via the input and output device 320 of the robot 212, such as a display output capable device (e.g., touch screen, display, etc.), a voice output capable device (e.g., speaker), etc.

Figure 4:
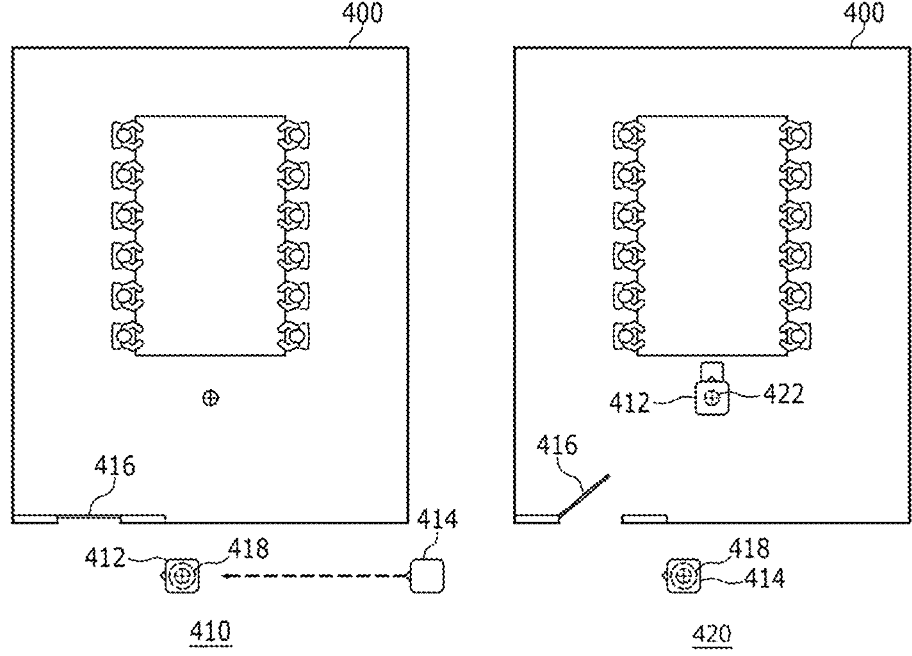
FIG. 4 illustrates an example in which a first serving robot provides a serving service.

FIG. 4 illustrates an example of a first serving robot 412 entering a target space 400 and providing the serving service. The processor (e.g., the processor 334) may control the first serving robot 412 and/or a second serving robot 414 to move to a waiting area 418 of the target space 400. The first serving robot 412 and/or the second serving robot 414 may refer to robots for providing serving services in the target space 400. As illustrated, a first operation 410 illustrates an example in which the second serving robot 414 moves to the waiting area 418 while the first serving robot 412 arrived in the waiting area 418 is waiting.

The processor 334 may acquire information that the first serving robot 412 is located in the waiting area 418 of the target space 400. For example, by comparing the position information received from the first serving robot 412 with the position information of the waiting area 418 stored in the database (e.g., the memory 332), the information that the first serving robot 412 is located in the waiting area 418 may be acquired. As another example, the processor 334 may receive, from the first serving robot 412, information that the first serving robot 412 is located in the waiting area 418.

The processor 334 may determine whether there is a robot in the target space 400. For example, the processor 334 may determine whether there is a robot in the target space 400 based on each of a plurality of position information received from at least some of a plurality of robots placed in the building (e.g., the building 100). As another example, the processor 334 may use an image sensor (e.g., a camera) included in the target space 400 to determine whether there is a robot in the target space 400.

In response to determining that there is no robot in the target space 400, the processor 334 may control a door 416 of the target space 400 to be opened. In this case, to control opening and closing of the door 416 by the processor 334, the door 416 may include a communication module (not illustrated) and a driving unit (not illustrated).

A second operation 420 illustrates an example in which the second serving robot 414 arrives and stays in the waiting area 418 while the first serving robot 412 entered the interior of the target space 400 is providing the serving service. In response to determining that the door 416 is open, the processor 334 may control the first serving robot 412 to leave the waiting area 418 and enter the interior of the target space 400. For example, in response to determining that the door 416 is open, the processor 334 may control the first serving robot 412 to move from the waiting area 418 to a first point 422 in the target space 400. In this case, a specific point on a local map stored in a database (e.g., the memory 332) may be determined to be the first point 422 in advance. In some example embodiments, the first point 422 may be calculated based on data acquired by an image sensor (e.g., camera) included in the target space 400, or may be calculated based on data acquired by an image sensor and/or a distance sensor (e.g., LiDAR) included in the first serving robot 412.

The processor 334 may control the first serving robot 412 to provide the serving service in the target space 400. For example, the processor 334 may control an item box built into the first serving robot 412 to be pulled out. As another example, the processor 334 may control the door of the item box built into the first serving robot 412 to be unlocked. As another example, the processor 334 may control an input and output interface (e.g., the input and output interface 318) of the first serving robot 412 to output a screen through which a password for unlocking the door of the item box may be input.

The processor 334 may receive information that the serving service of the first serving robot 412 is completed. For example, the processor 334 may receive, from the first serving robot 412, information that the serving service of the first serving robot 412 is completed. In response to receiving the information that the serving service is completed, and the processor 334 may control the first serving robot 412 to exit the target space 400.

The processor 334 may acquire information that the second serving robot 414 to enter the target space 400 is located in the waiting area 418 of the target space 400. For example, the information that the second serving robot 414 is located in the waiting area 418 may be acquired by comparing the position information received from the second serving robot 414 with the position information of the waiting area 418 stored in the database (e.g., the memory 332). As another example, the processor 334 may receive, from the second serving robot 414, information that the second serving robot 414 is located in the waiting area 418.

The processor 334 may determine whether there is a robot in the target space 400. For example, the processor 334 may determine whether there is the first serving robot 412 in the target space 400. In response to determining that there is the first serving robot 412 in the target space 400, the processor 334 may control the second serving robot 414 to wait in the waiting area 418.

Figure 5:
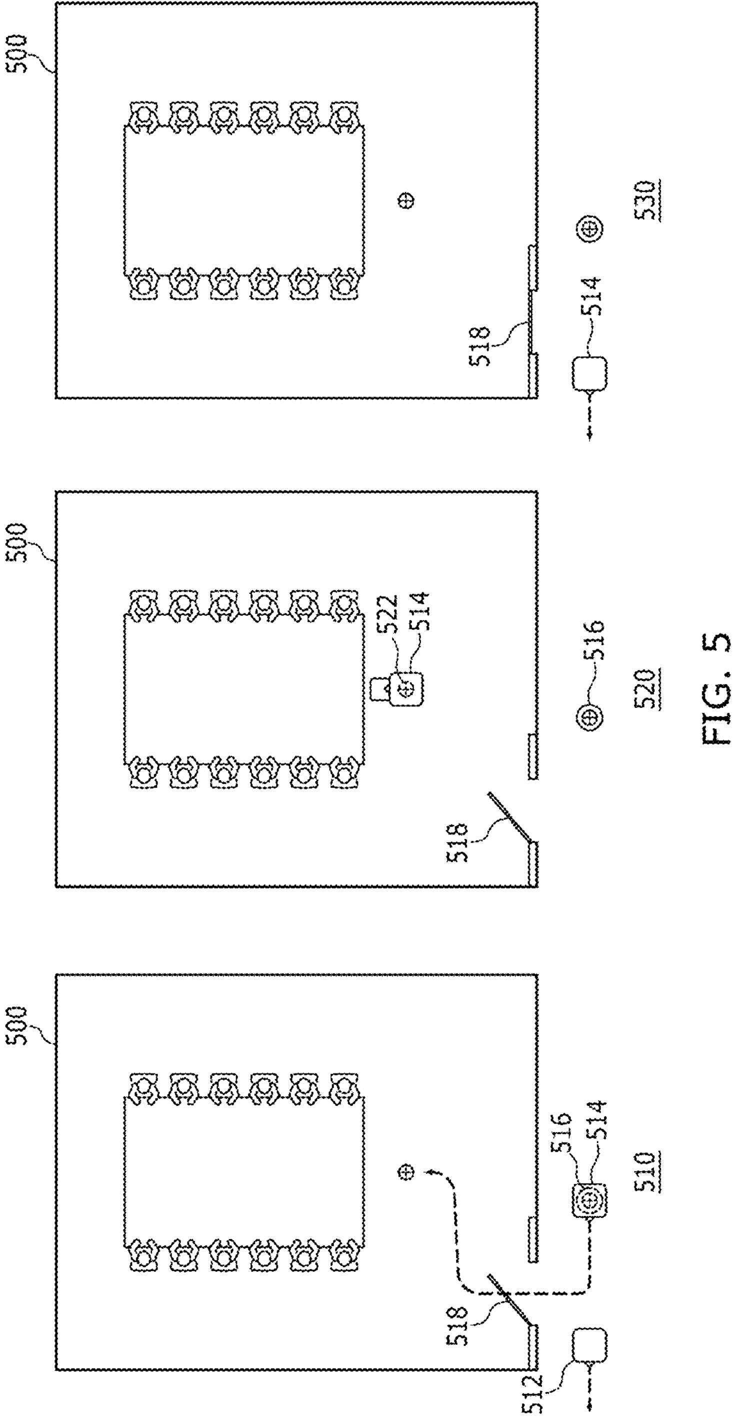
FIG. 5 illustrates an example in which a second serving robot provides the serving service after the first serving robot provides the serving service.

FIG. 5 illustrates an example in which a second serving robot 514 provides the serving service after a first serving robot 512 provides the serving service. The processor (e.g., the processor 334) may control the second serving robot 514 to enter a target space 500 and provide the serving service after the first serving robot 512 exits. As illustrated, a first operation 510 illustrates an example in which the first serving robot 512 exits the target space 500 while the second serving robot 514 is waiting in a waiting area 516.

The processor 334 may control the first serving robot 512 to exit the target space 500 in response to receiving the information that the serving service of the first serving robot 512 is completed. For example, if all the items loaded on the first serving robot 512 are served, the processor 334 may receive, from the first serving robot 512, the information that the serving service is completed, and control the first serving robot 512 to exit the target space 500. Additionally or alternatively, even when not all the items loaded on the first serving robot 512 are served, the processor 334 may receive the information that the serving service of the first serving robot 512 is completed. For example, if a menu different from a menu ordered by the user is delivered through the first serving robot 512, the user may want to return the different menu through the first serving robot 512. In this case, as the first serving robot 512 receives a user input that the serving is completed through a touch input to the interface (e.g., the input and output interface 318), etc., the processor 334 may receive the information that the serving service is completed from the first serving robot 512. Alternatively, the processor 334 may receive information that the serving service is completed from the user terminal associated with the robot control system (e.g., the robot control system 230).

In response to determining that the exit of the first serving robot 512 is completed, the processor 334 may determine whether there is the second serving robot 514 to enter the target space 500. For example, based on the information that the second serving robot 514 to enter the target space 500 is located in the waiting area 516 of the target space 500, the processor 334 may determine that there is the second serving robot 514 to enter the target space 500. Additionally, even when the second serving robot 514 is not located in the waiting area 516, the processor 334 may determine that there is the second serving robot 514 to enter the target space 500, based on information that the second serving robot 514 may be located within a certain distance or within a certain time from the waiting area 516 of the target space 500. That is, if the second serving robot 514 is located in the waiting area 516 or is close to the waiting area 516 after the exit of the first serving robot 512 is completed, the processor 334 may determine that there is the second serving robot 514 to enter the target space 500. Accordingly, if the second serving robot 514 is located outside a certain distance or on another floor from the waiting area 516 of the target space 500 or cannot arrive within a certain time, the processor 334 may determine that there is no second serving robot 514 to enter the target space 500.

If it is determined that there is the second serving robot 514 to enter the target space 500, a door 518 of the target space 500 may be controlled to remain in the open state. When the exit of the first serving robot 512 is completed, the processor 334 may control the door 518 of the target space 500 to remain in the open state, based on the information that the second serving robot 514 is located in the waiting area 516. For example, if the second serving robot 514 arrives in the waiting area 516 within a certain time after the first serving robot 512 arrives in the waiting area 516, the processor 334 may efficiently control the driving of the door 518 by maintaining the door 518 open for the second serving robot 514 that will soon enter the target space 500. Alternatively, if it is determined that there is no second serving robot 514 to enter the target space 500, the processor 334 may control the door 518 of the target space 500 to be closed. For example, if the second serving robot 514 does not arrive within a certain time after the first serving robot 512 arrives in the waiting area 516, the processor may control the door 518 to be closed for the convenience of the user(s) using the target space 500.

Meanwhile, in the present disclosure, controlling to the door to maintain the open or closed state may include transmitting, by the processor 334, a control signal for maintaining the open or closed state to the door 518, and/or not transmitting the control signal so that the open or closed state of the door 518 is maintained.

A second operation 520 illustrates an example in which the second serving robot 514 enters the target space 500 and provides the serving service. If the door 518 remains open after the exit of the first serving robot 512, the processor 334 may omit the process of determining whether there is the robot in the target space 500 and the process of controlling the door 518 of the target space 500 to be opened in response to determining that there is no robot in the target space 500. According to another aspect, if the door 518 is closed after the exit of the first serving robot 512, the processor may determine whether there is no robot in the target space 500, and control the door 518 of the target space 500 to be opened in response to determining that there is no robot in a target space 600.

In response to determining that the door 518 of the target space 500 is open, the processor 334 may control the second serving robot 514 to leave the waiting area 516 and enter the target space 500. For example, the processor 334 may control the second serving robot 514 to move from the waiting area 516 to a first point 522 in the target space 500. The processor 334 may control the second serving robot 514 to provide the serving service in the target space 500.

A specific point on a local map stored in a database (e.g., the memory 332) may be determined to be the first point 522 in advance. According to another aspect, the first point 522 may be calculated based on data acquired by an image sensor (e.g., camera) included in the target space 500, or may be calculated based on data acquired by an image sensor and/or a distance sensor (e.g., LiDAR) included in the second serving robot 514. Additionally, the first point 522 may be the same as or different from the first point (e.g., the first point 422) of FIG. 4.

A third operation 530 illustrates an example in which the second serving robot 514 exits the target space 500. The processor 334 may control the second serving robot 514 to exit the target space 500 in response to receiving information that the serving service of the second serving robot 514 is completed. In this case, the processor 334 may receive the information that the serving service of the second serving robot 514 is completed according to the same or similar method as receiving the information that the serving service of the first serving robot 512 is completed in the first operation 510 described above.

In response to determining that the exit of the second serving robot 514 is completed, the processor 334 may determine whether there is a third serving robot (not illustrated) to enter the target space 500. In this case, the processor 334 may determine whether there is the third serving robot to enter the target space 500 in the same or similar manner as determining whether there is the second serving robot 514 to enter the target space 500 in the first operation 510.

The processor 334 may control opening and closing of the door 518 of the target space 500 based on whether there is the third serving robot to enter the target space 500. For example, if it is determined that there is no third serving robot to enter the target space 500, the processor 334 may control the door 518 to remain open. As another example, if it is determined that there is the third serving robot to enter the target space 500, the processor 334 may control the door 518 to be closed. That is, if the second serving robot 514 is the last serving robot that provides the serving service in the target space 500 according to a user's serving request, after the second serving robot 514 exits the target space 500, the door 518 may be controlled to be closed.

Figure 6:
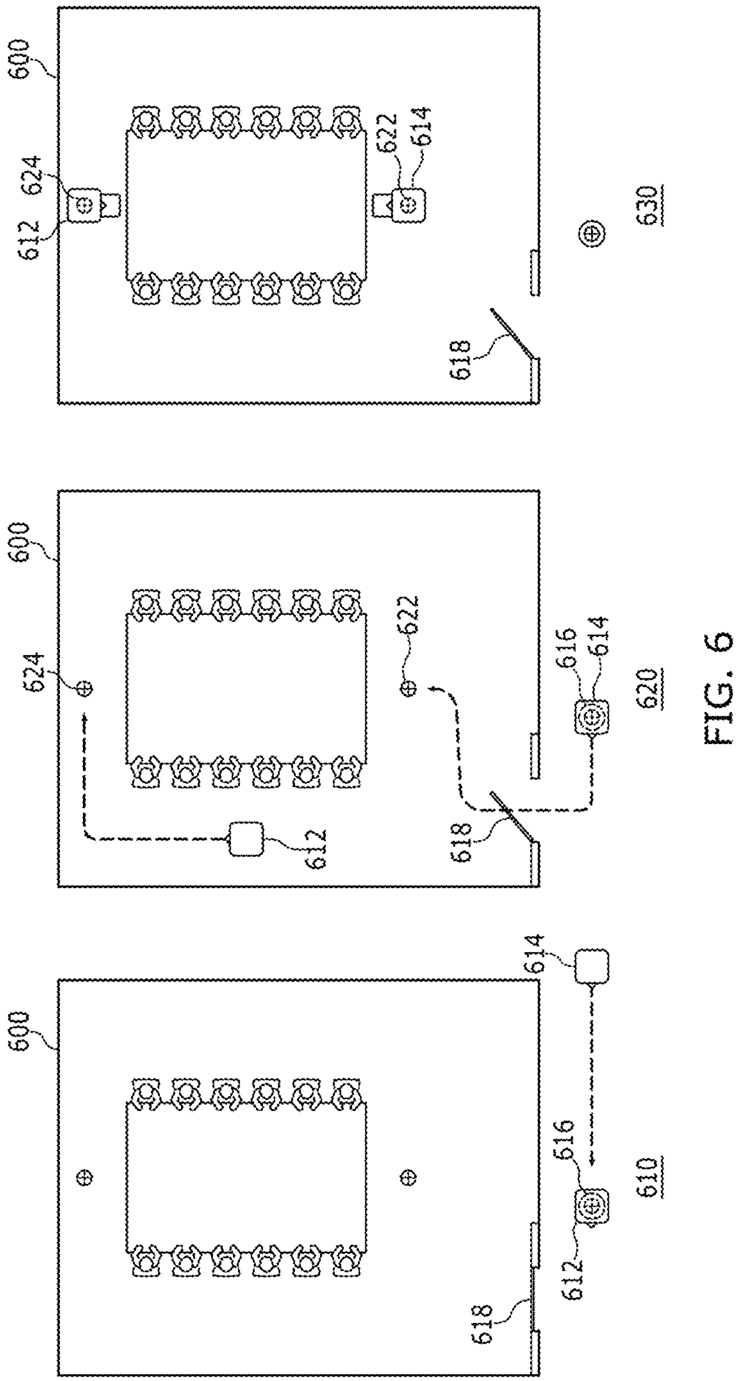
FIG. 6 illustrates an example in which the first serving robot and the second serving robot provide serving services.

FIG. 6 illustrates an example in which a first serving robot 612 and a second serving robot 614 provide serving services. A processor (e.g., the processor 334) may control the first serving robot 612 and the second serving robot 614, that is, the robots to provide serving services in the target space 600, to move to a waiting area 616 of the target space 600. As illustrated, a first operation 610 illustrates an example in which the second serving robot 614 moves to the waiting area 616 while the first serving robot 612 arrives in the waiting area 616 of the target space 600 is waiting.

The processor 334 may acquire information that the first serving robot 612 is located in the waiting area 616 of the target space 600. For example, the information that the first serving robot 612 is located in the waiting area 616 may be acquired by comparing the position information received from the first serving robot 612 with the position information of the waiting area 616 stored in the database (e.g., the memory 332). As another example, the processor 334 may receive, from the first serving robot 612, information that the first serving robot 612 is located in the waiting area 616.

The processor 334 may determine whether there is a robot in the target space 600. For example, the processor 334 may determine whether there is a robot in the target space 600 based on each of a plurality of position information received from at least some of a plurality of robots placed in the building (e.g., the building 100). As another example, the processor 334 may use an image sensor (e.g., a camera) included in the target space 600 to determine whether there is a robot in the target space 600.

In response to determining that there is no robot in the target space 600, the processor 334 may control a door 618 of the target space 600 to be opened. In this case, to control opening and closing of the door 618 by the processor 334, the door 618 may include a communication module (not illustrated) and a driving unit (not illustrated).

A second operation 620 illustrates an example in which the second serving robot 614 arrives and waits in the waiting area 616 while the first serving robot 612 enters the interior of the target space 600. In response to determining that the door 618 is open, the processor 334 may control the first serving robot 612 to leave the waiting area 616 and enter the interior of the target space 600. For example, in response to determining that the door 618 is open, the processor 334 may control the first serving robot 612 to move from the waiting area 616 to a first point 624 in the target space 600. In this case, a specific point on a local map stored in a database (e.g., the memory 332) may be determined to be the first point 624 in advance. According to another aspect, the first point 624 may be determined based on data acquired by an image sensor included in the target space 600. According to another aspect, the first point 624 may be determined based on data acquired by the image sensor and/or the distance sensor included in the first serving robot 612.

The processor 334 may control the door 618 to remain open for the entry of the second serving robot 614 after the first serving robot 612 enters the target space 600.

Meanwhile, in the second operation 620, it is illustrated that the second serving robot 614 waits in the waiting area 616 while the first serving robot 612 is moving to the first point 624, but aspects are not limited thereto. For example, while the first serving robot 612 is moving to the first point 624, the processor 334 may control the second serving robot 614 to enter the target space 600 and move to a second point 622 therein. As another example, in response to the first serving robot 612 completing moving to the first point 624, the processor 334 may control the second serving robot 614 to enter the target space 600 and move to the second point 622 therein. In this case, a specific point on a local map stored in a database (e.g., the memory 332) may be determined to be the second point 622 in advance. According to another aspect, the second point 622 may be determined based on data acquired by an image sensor included in the target space 600. According to another aspect, the second point 622 may be determined based on data acquired by the image sensor and/or the distance sensor included in the second serving robot 614.

A third operation 630 illustrates an example in which the first serving robot 612 and the second serving robot 614 provide the serving services at the first point 624 and the second point 622, respectively. In this case, the distance from the door 618 to the first point 624 of the target space 600 may be greater than the distance from the door 618 to the second point 622 of the target space 600. That is, the first serving robot 612 that is the first robot to enter the target space 600 may move farther into the space than the second serving robot 614 and provide the serving service at that location in the target space 600. In this way, if the first serving robot 612 first starts entering and moving to the first point 624 and then the second serving robot 614 starts entering and moving to the second point 622, the first serving robot 612 and the second serving robot 614 arrive at the first point 624 and the second point 622 at similar times, respectively, so that users are also provided with services at similar times and users do not have to wait for the other users to be served. That is, it is possible to control the serving robots 612 and 614 efficiently, and also improve user convenience.

Figure 7:
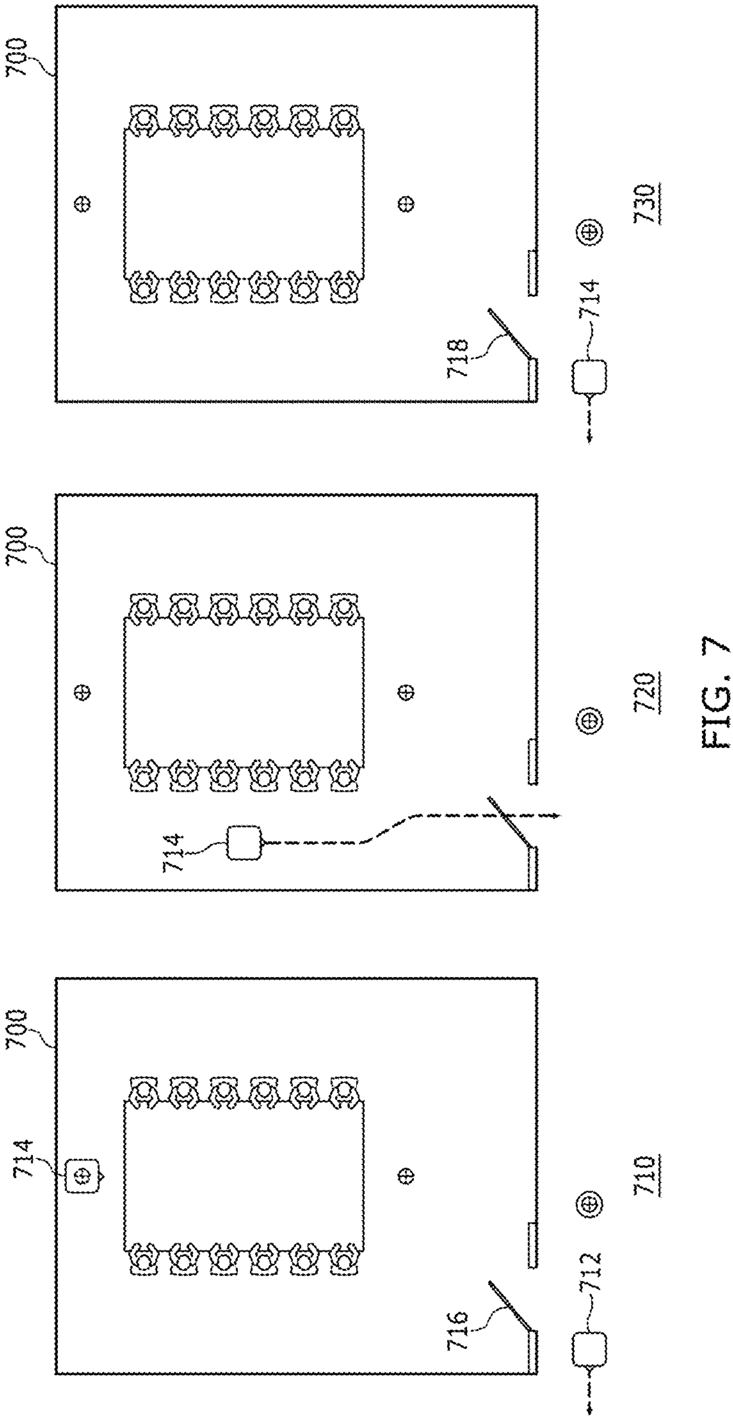
FIG. 7 illustrates an example in which the first serving robot and the second serving robot exit the target space.

FIG. 7 illustrates an example in which a first serving robot 712 and a second serving robot 714 exit a target space 700. As illustrated, a first operation 710 illustrates an example in which the second serving robot 712, from among the first serving robot 714 and the second serving robot 712, that provided the serving services in the target space 500 exits first. The processor (e.g., the processor 334) may control the second serving robot 712 to exit the target space 700 in response to determining that the serving service of the first serving robot 714 and the serving service of the second serving robot 712 are completed. As described above, if the second serving robot 712 exits first and then the first serving robot 714 exits, there is no possibility that the second serving robot 712 located closer to a door 716 will act as an obstacle to the first serving robot 714 on the path where the first serving robot 714 exits. That is, the processor 334 can safely perform control while mitigating or preventing collisions between the serving robots 712 and 714. In this case, the processor 334 may control the door 716 to remain open for the exit of the first serving robot 714.

A second operation 720 illustrates an example in which the first serving robot 714 exits after the exit of the second serving robot 712 is completed. The processor 334 may control the first serving robot 714 to exit the target space 700 in response to determining that the exit of the second serving robot 712 is completed.

A third operation 730 illustrates an example in which the exit of the first serving robot 714 is completed. In response to determining that the exit of the first serving robot 714 is completed, the processor 334 may control a door 718 of the target space 700 to be closed. In this case, the processor 334 may determine whether there is a robot to additionally enter the target space 700 before controlling to close the door 718 of the target space 700. The door 718 of the target space 700 may be controlled to be closed only when there is no additional robot.

Figure 8:
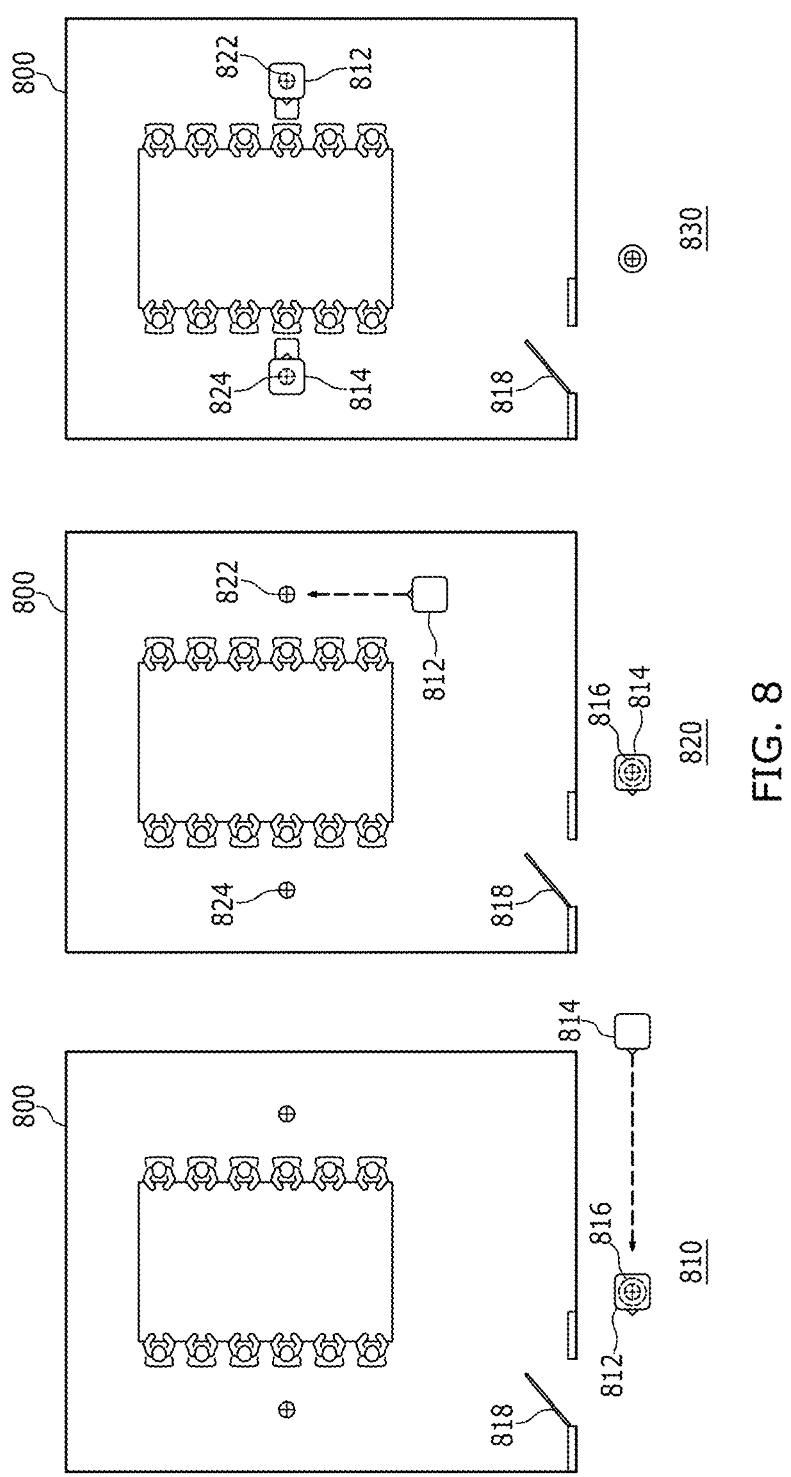
FIG. 8 illustrates another example of a first point and a second point.

FIG. 8 illustrates another example of a first point 822 and a second point 824. As illustrated, the first point 822 and the second point 824 may be located on the user side such that the user may directly pick up the item to be served from a serving robot 812. A first operation 810 illustrates an example in which a second serving robot 814 moves to a waiting area 816 while the first serving robot 812 arrives in the waiting area 816 of a target space 800 is waiting.

The processor 334 may acquire information that the first serving robot 812 is located in the waiting area 816 of the target space 800. For example, the information that the first serving robot 812 is located in the waiting area 816 may be acquired by comparing the position information received from the first serving robot 812 with the position information of the waiting area 816 stored in the database (e.g., the memory 332). As another example, the processor may receive, from the first serving robot 812, information that the first serving robot 812 is located in the waiting area 816. In this case, the information may be acquired by the first serving robot 812.

The processor 334 may determine whether there is a robot in the target space 800. For example, the processor 334 may determine whether there is a robot in the target space 800 based on each of a plurality of position information received from at least some of the robots placed in the building. As another example, the processor 334 may use an image sensor (e.g., a camera) included in the target space 800 to determine whether there is a robot in the target space 800.

In response to determining that there is no robot in the target space 800, the processor may control a door 818 of the target space 800 to be opened. In this case, to control opening and closing of the door by the processor, the door 818 may include a communication module (not illustrated) and a driving unit (not illustrated).

A second operation 820 illustrates an example in which the second serving robot 814 arrives and waits in the waiting area 816 after the first serving robot 812 arrives at the first point 822 of the target space 800. In response to determining that the door 818 is open, the processor 334 may control the first serving robot 812 to leave the waiting area 816 and enter the interior of the target space 800. For example, in response to determining that the door 818 is open, the processor 334 may control the first serving robot 812 to move from the waiting area 616 to a first point 822 in the target space 800. In this case, a specific point on a local map stored in a database (e.g., the memory 332) may be determined to be the first point 822 in advance. According to another aspect, the first point 822 may be determined based on data acquired by an image sensor included in the target space 800. According to another aspect, the first point 822 may be determined based on data acquired by the image sensor and/or the distance sensor included in the first serving robot 812.

The processor may control the door 818 to remain open for the entry of the second serving robot 814 after the first serving robot 812 enters the target space 800.

Meanwhile, in the second operation 820, it is illustrated that the second serving robot 814 waits in the waiting area 816 while the first serving robot 812 is moving to the first point 822, but aspects are not limited thereto. For example, while the first serving robot 812 is moving to the first point 822, the processor 334 may control the second serving robot 814 to enter the target space 800 and move to the second point 824 therein. As another example, in response to the first serving robot 812 completing moving to the first point 822, the processor 334 may control the second serving robot 614 to enter the second point 824 in the target space 800. In this case, a specific point on a local map stored in a database (e.g., the memory 332) may be determined to be the first point 824 in advance. According to another aspect, the second point 824 may be determined based on data acquired by an image sensor included inside the target space 800. According to another aspect, the second point 824 may be determined based on data acquired by the image sensor and/or the distance sensor included in the second serving robot 814.

A third operation 830 illustrates an example in which the first serving robot 812 and the second serving robot 814 provide the serving services at the first point 822 and the second point 824, respectively. In this case, the distance from the door 818 to the first point 822 of the target space 800 may be greater than the distance from the door 818 to the second point 824 of the target space 800. That is, the first serving robot 812 that is the first robot to enter the target space 800 may move farther into the space than the second serving robot 814 and provide the serving service at that location in the target space 800. In this way, if the first serving robot 812 first starts entering and moving to the first point 822 and then the second serving robot 814 starts entering and moving to the second point 824, the first serving robot 812 and the second serving robot 814 arrive at the first point 822 and the second point 824 at similar times, respectively, so that users are also provided with services at similar times and users do not have to wait for the other users to be served. That is, it is possible to control the serving robots 812 and 814 efficiently, and also improve user convenience.

Figure 9:
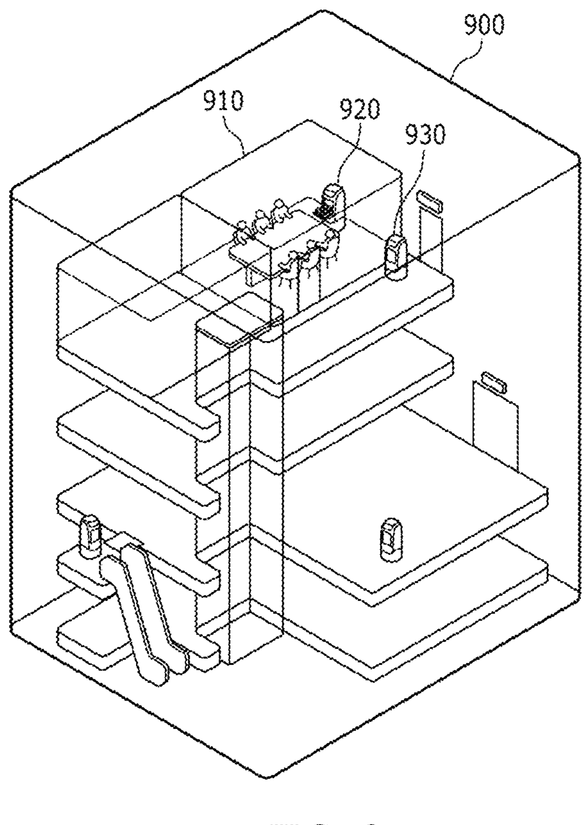
FIG. 9 is a diagram illustrating an example of serving robots placed in a building.

FIG. 9 is a diagram illustrating an example of serving robots 920 and 930 placed in a building 900. The serving robots 920 and 930 may autonomously drive in the building 900 and provide the service. For example, the serving robots 920 and 930 may provide services such as moving between cafe and conference rooms in the building 900 and serving coffees, placed in a restaurant in the building 900 and serving foods, delivering lunch boxes to the place of the person who ordered the lunch box, and so on.

The serving robots 920 and 930 may be controlled by signals, data, information, etc. received from a robot control system (not illustrated) communicating with the serving robots 920 and 930. For example, the serving robot 920 may move and enter a target space 910 based on the control signal received from the robot control system and provide the serving service in the target space 910. As another example, the serving robot 930 may stop at a desired (or alternatively, predetermined) place outside the target space 900 based on the control signal received from the robot control system.

The serving robots 920 and 930 may autonomously drive in the building 900 using a local map (or map data) of the building 900. For example, the serving robots 920 and 930 may autonomously drive in the building 900 using a local map stored in the robot control system. In this case, the local map may be generated by a mapping robot (not illustrated) that is equipped with one or more sensors (e.g., cameras, LiDAR sensors, GPS sensors, etc.) and collects map data while driving in the building 900. Additionally, the serving robots 920 and 930 may use a sensor, etc. included in the serving robots 920 and 930 to directly generate a local map, and may use the generated local map to autonomously drive in the building 900.

Figure 10:
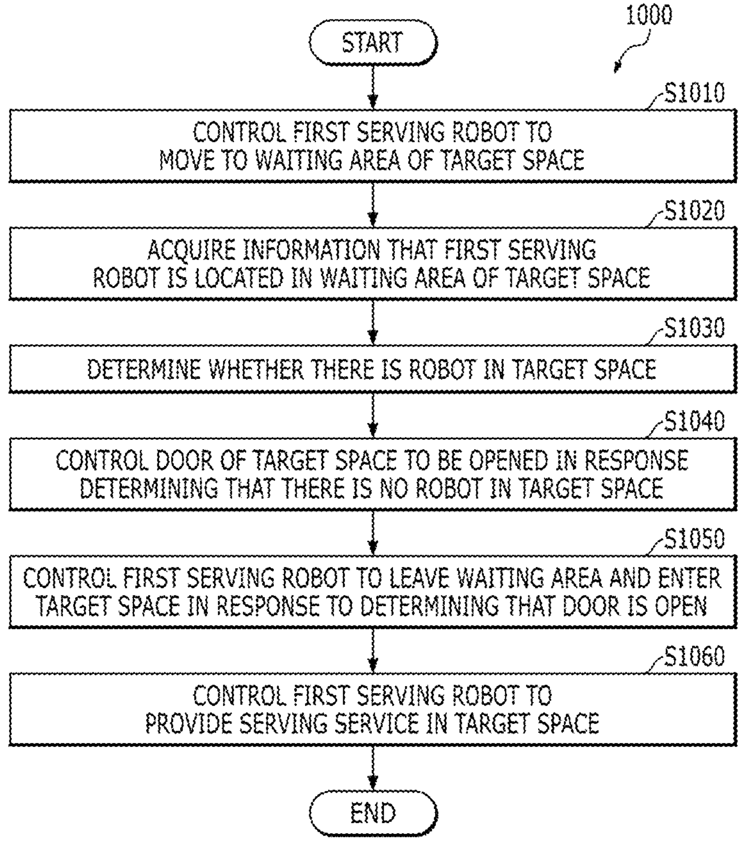
FIG. 10 illustrates an example of a method for controlling serving robots and facilities.

FIG. 10 illustrates an example of a method 1000 for controlling serving robots and facilities. The method 1000 may be performed by at least one processor (e.g., the processor 334) of the information processing system. As illustrated, the method 1000 may be initiated by controlling the first serving robot to move to the waiting area of the target space, at S1010.

The processor 334 may acquire information that the first serving robot is located in the waiting area of the target space, at S1020. The processor 334 may determine whether there is a robot in the target space at S1030, and control the door of the target space to be opened in response determining that there is no robot in the target space, at S1040.

The processor 334 may control the first serving robot to leave the waiting area and enter the interior of the target space in response to determining that the door is open, at S1050. The processor 334 may control the first serving robot to provide the serving service in the target space, at S1060.

The processor 334 may control the first serving robot to exit the target space in response to receiving the information that the serving service of the first serving robot is completed. In response to determining that the exit of the first serving robot is completed, the processor may determine whether there is a second serving robot to enter the target space. In this case, the processor may control opening and closing of the door of the target space based on whether there is the second serving robot to enter the target space.

The processor 334 may control the door of the target space to remain open, if it is determined that there is the second serving robot to enter the target space. If it is determined that there is no second serving robot to enter the target space, the processor 334 may control the door of the target space to be closed. To this end, the processor 334 may acquire information that the second serving robot to enter the target space is located in the waiting area of the target space.

The processor 334 may control the second serving robot to provide the serving service in the target space. The processor 334 may control the second serving robot to exit the target space in response to receiving the information that the serving service of the second serving robot is completed.

In response to determining that the exit of the second serving robot is completed, the processor 334 may determine whether there is a third serving robot to enter the target space. The processor 334 may control the opening and closing of the door of the target space based on whether there is the third serving robot to enter the target space.

The processor 334 may control the second serving robot that is supposed to enter the target space to move to the waiting area of the target space. In this case, the processor 334 may acquire information that the second serving robot to enter the target space is located in the waiting area of the target space. Accordingly, the processor 334 may determine whether there is the first serving robot in the target space, and control the second serving robot to wait in the waiting area in response to determining that there is the first serving robot in the target space.

The processor 334 may control the first serving robot to provide the serving service at the first point of the target space. In this case, the processor 334 may control the second serving robot to move to the waiting area of the target space. The processor 334 may control the second serving robot to enter the interior of the target space and provide the serving service at the second point. In this case, it may be configured such that the distance to the first point from the door of the target space is greater than the distance to the second point from the door of the target space. In addition, the first point may be located on one side in the target space, and the second point may be located on the opposite side of one side. Additionally, the processor may control the second serving robot to exit the target space in response to determining that the serving service of the first serving robot and the serving service of the second serving robot are completed. In response to determining that the exit of the second serving robot is complete, it is possible to control the first serving robot to exit the target space.

Figure 11:
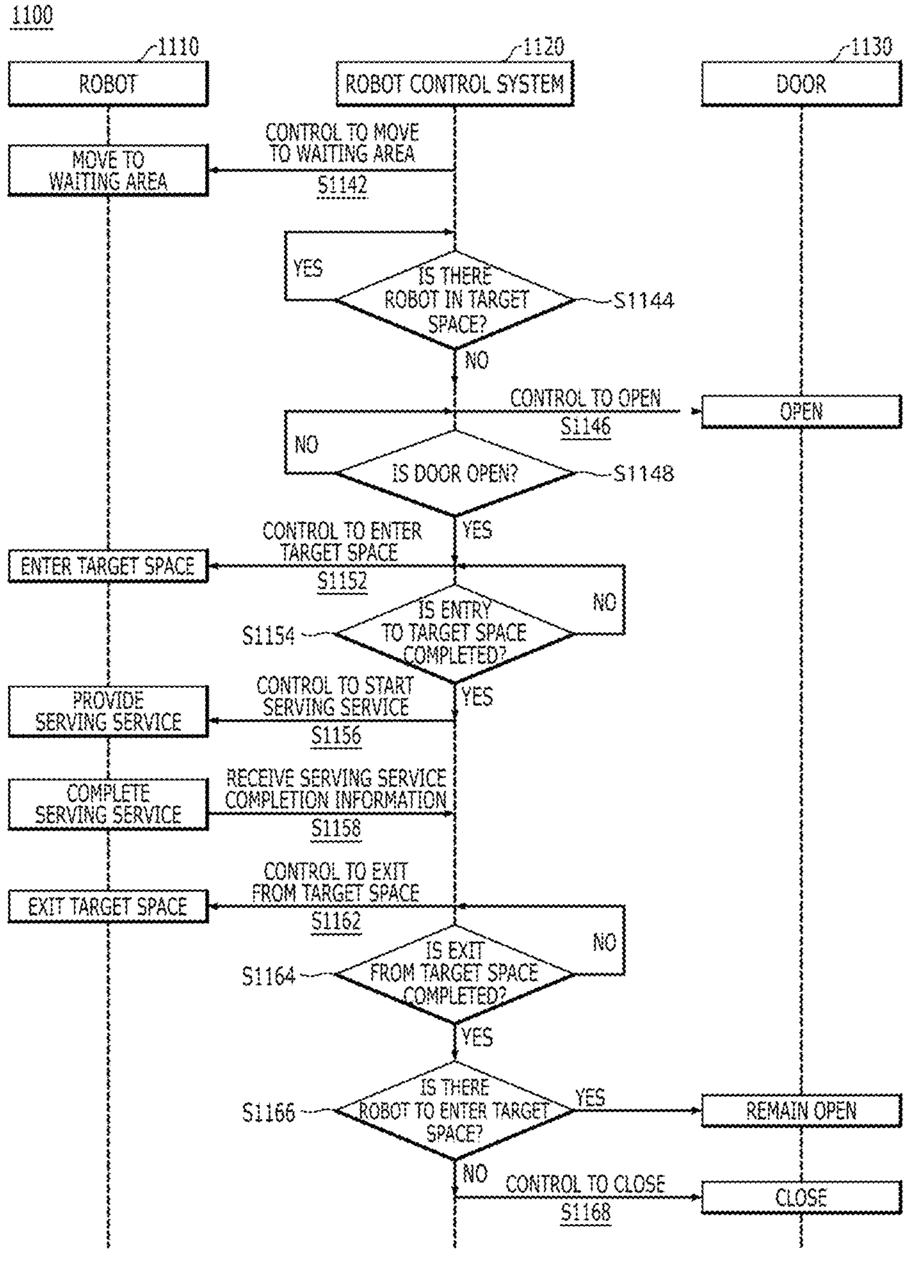
FIG. 11 is a flowchart illustrating a method for controlling a robot and a door by a robot control system.

FIG. 11 is a flowchart illustrating a method 1110 for controlling a robot 1110 and a door 1130 by a robot control system 1120. As illustrated, the method 1110 may be initiated by controlling the robot 1110 to move to the waiting area, at S1142. Meanwhile, the robot control system 1120 may receive position information of the robot 1110, which is used for controlling the robot 1110 and/or the door 1130, from the robot 1110 in a desired (or alternatively, predetermined) time unit, although the corresponding operation is not illustrated in FIG. 11.

Based on the position information of the robot 1110, the robot control system 1120 may acquire information that the robot 1110 is located in the waiting area. For example, the robot control system 1120 may acquire the information that the robot 1110 is located in the waiting area by comparing the position information of the robot 1110 with the position information of the waiting area stored in the robot control system 1120. Additionally or alternatively, the robot control system 1120 may receive information from the robot 1110 indicating that the robot 1110 has arrived in the waiting area.

The robot control system 1120 may determine whether there is a robot in the target space, at S1144. In this case, if it is determined that there is the robot in the target space, it may be determined again whether there is a robot in the target space after any time elapses, at S1144. On the other hand, if it is determined that there is no robot in the target space, the robot control system 1120 may control the door 1130 of the target space to be opened, at S1146.

The robot control system 1120 may determine whether the door 1130 is opened, at S1148. In this case, if it is determined that the door 1130 of the target space is not opened, the robot control system 1120 may control the door 1130 of the target space again to be opened after any time elapses, at S1148. On the other hand, if it is determined that the door 1130 of the target space is open, the robot control system 1120 may control the robot 1110 to enter the target space, at S1152.

The robot control system 1120 may determine if the robot 1110 completely entered the target space or moved to a specific point (e.g., the first point 154 and the second point 156) in the target space, at S1154. For example, the robot control system 1120 may determine whether the robot 1110 entered the target space by comparing the position information of the robot 1110 with the position information of the target space or a specific point in the target space (e.g., the first point 154 and the second point 156) stored in the robot control system 1120. Additionally or alternatively, the robot control system 1120 may determine, from the robot 1110, whether the robot 1110 entered the target space.

The robot control system 1120 may control the robot 1110 to provide the serving service, at S1156. The robot control system 1120 may receive, from the robot 1110, information that the serving service is completed at S1158, and in response to receiving the information, control the robot 1110 to exit the target space at S1162.

The robot control system 1120 may determine whether the exit of the robot 1110 from the target space is completed, at S1164. In this case, if the exit of the robot 1110 is not completed, the robot control system 1120 may determine again whether the exit of the robot 1110 from the target space is completed after any time elapses, at S1164. On the other hand, if the exit of the robot 1110 is completed, the robot control system 1120 may determine whether there is a robot to enter the target space, at S1166. The robot control system 1120 may control the door 1130 to be closed if there is no robot to enter the target space at S1168, and control the door 1130 to remain in the open state if there is a robot to enter the target space.

There may be provided a computer-readable non-transitory recording medium storing instructions for causing performance of the method described above on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessible to a computer.

By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may be present in the ASIC. The ASIC may be present in the user terminal. Alternatively, the processor and storage medium may be present as separate components in the user terminal.

Any functional blocks shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

What is claimed is:

1. A method for controlling robots and facilities, the method being performed by one or more processors and comprising:

controlling a first robot to move to a waiting area for a target space;

acquiring information that the first robot is located in the waiting area for the target space;

determining whether a robot is present in the target space;

controlling, in response to determining that no robot is present in the target space, a door of the target space to be opened;

controlling, in response to determining that the door is open, the first robot to leave the waiting area and enter the target space;

controlling the first robot to provide a serving service in the target space, controlling, in response to receiving information that the serving service of the first robot is completed, the first robot to exit the target space;

determining, in response to determining that an exit of the first robot is completed, whether a second robot to enter the target space is present; and controlling, based on whether the second robot to enter the target space exists, opening and closing of the door of the target space.

2. The method according to claim 1, wherein the controlling the opening and closing of the door of the target space includes:

controlling the door of the target space to remain open, if the second robot to enter the target space is present; and controlling the door of the target space to be closed, if no second robot to enter the target space is present.

3. The method according to claim 1, wherein the determining whether the second robot to enter the target space is present includes acquiring information that the second robot to enter the target space is located in the waiting area for the target space.

4. The method according to claim 1, further comprising:

controlling the second robot to provide the serving service in the target space;

controlling, in response to receiving information that the serving service of the second robot is completed, the second robot to exit the target space;

determining, in response to determining that an exit of the second robot is completed, whether there is a third robot to enter the target space; and controlling, based on whether there is the third robot to enter the target space, opening and closing of the door of the target space.

5. The method according to claim 1, further comprising:

controlling a second robot to enter the target space to move to the waiting area for the target space;

acquiring information that the second robot to enter the target space is located in the waiting area of the target space;

determining whether there is the first robot in the target space; and controlling, in response to determining that the first robot is present in the target space, the second robot to wait in the waiting area.

6. The method according to claim 1, wherein the controlling the first robot to provide the serving service in the target space includes controlling the first robot to provide the serving service at a first point in the target space, and the method further comprises, controlling a second robot to move to the waiting area for the target space, and controlling the second robot to enter the target space and provide the serving service at a second point.

7. The method according to claim 6, wherein a distance from the door of the target space to the first point is greater than a distance from the door of the target space to the second point.

8. The method according to claim 7, further comprising:

controlling, in response to determining that the serving service of the first robot and a serving service of the second robot are completed, the second robot to exit the target space; and controlling, in response to determining that an exit of the second robot is completed, the first robot to exit the target space.

9. The method according to claim 6, wherein the first point is located on one side in the target space, and the second point is located on an opposite side of the one side.

10. A non-transitory computer-readable recording medium storing instructions that, when executed by one or more processors, cause a robot control system to perform the method according to claim 1.

11. A robot control system comprising:

a memory; and one or more processors connected to the memory and configured to execute one or more computer-readable programs included in the memory to cause the robot control system to, control a first robot to move to a waiting area for a target space, acquire information that the first robot is located in the waiting area for the target space, determine whether a robot is present in the target space, control, in response to determining that no robot is present in the target space, a door of the target space to be opened, control, in response to determining that the door is open, the first robot to leave the waiting area and enter the target space, control the first robot to provide a serving service in the target space, receive completion information of the serving service of the first robot, control, in response to the completion information indicating that the serving service of the first robot is completed, the first robot to exit the target space, determine, in response to determining that an exit of the first robot is completed, whether a second robot to enter the target space is present, and control, based on whether the second robot to enter the target space is present, opening and closing of the door of the target space.

12. A building comprising a plurality of robots configured to drive in the building and provide serving services, wherein the plurality of robots include a first robot and a second robot, the plurality of robots are configured to be controlled by a robot control system, and the robot control system includes, a memory, and one or more processors connected to the memory and configured to execute one or more computer-readable programs included in the memory to cause the robot control system to, control a first robot to move to a waiting area for a target space, acquire information that the first robot is located in the waiting area for the target space, determine whether a robot is present in the target space, control, in response to determining that no robot is present in the target space, a door of the target space to be opened, control, in response to determining that the door is open, the first robot to leave the waiting area and enter the target space, control the first robot to provide a serving service in the target space, receive completion information of the serving service of the first robot, control, in response to the completion information indicating that the serving service of the first robot is completed, the first robot to exit the target space, determine, in response to determining that an exit of the first robot is completed, whether a second robot to enter the target space is present, and control, based on whether the second robot to enter the target space is present, opening and closing of the door of the target space.

* * * * *